US009158337B2

(12) United States Patent
Leung

(10) Patent No.: US 9,158,337 B2
(45) Date of Patent: Oct. 13, 2015

(54) DOCKING STATION WITH SPEAKERS FOR MEDIA PLAYER

(71) Applicant: Alco Electronics Limited, Hong Kong (CN)

(72) Inventor: Wilson Wai Sing Leung, Hong Kong (CN)

(73) Assignee: ALCO ELECTRONICS LIMITED, Hong Kong (CN)

( * ) Notice: Subject to any disclaimer, the term of this patent is extended or adjusted under 35 U.S.C. 154(b) by 295 days.

(21) Appl. No.: 13/667,513

(22) Filed: Nov. 2, 2012

(65) Prior Publication Data

US 2013/0117487 A1 May 9, 2013

(30) Foreign Application Priority Data

Nov. 4, 2011 (CN) .................................. 11111974.4

(51) Int. Cl.
*G06F 13/00* (2006.01)
*G06F 1/16* (2006.01)

(52) U.S. Cl.
CPC ........ *G06F 1/1632* (2013.01); *H04R 2205/021* (2013.01)

(58) Field of Classification Search
USPC .......... 710/62–64, 72–74, 300–306; 381/300, 381/386–388, 394, 332–334
See application file for complete search history.

(56) References Cited

U.S. PATENT DOCUMENTS

| 7,889,494 | B2 | | 2/2011 | Stampfli |
| 8,150,460 | B1 | * | 4/2012 | Curtis et al. .................. 455/557 |
| 8,265,319 | B2 | * | 9/2012 | Groset et al. .................. 381/334 |
| D688,228 | S | * | 8/2013 | Ryu et al. .................. D14/209.1 |
| 2006/0013411 | A1 | | 1/2006 | Lin |
| 2006/0280045 | A1 | * | 12/2006 | Ritsher et al. ............... 369/30.01 |
| 2007/0230723 | A1 | * | 10/2007 | Hobson et al. ................ 381/300 |
| 2009/0180660 | A1 | | 7/2009 | Groset et al. |
| 2010/0158303 | A1 | | 6/2010 | Tse |

(Continued)

FOREIGN PATENT DOCUMENTS

| CN | 101904614 A | 12/2010 |
| CN | 201893113 U | 7/2011 |
| GB | 2479186 A | 10/2011 |

OTHER PUBLICATIONS

Great Britain Intellectual Property Office, Search Report in Great Britain Patent Application No. GB1219847.9 (Apr. 19, 2013).

(Continued)

*Primary Examiner* — Raymond Phan

(74) *Attorney, Agent, or Firm* — Leydig, Voit & Mayer, Ltd.

(57) ABSTRACT

A speaker docking station for an iPad has a housing having a seat for supporting the iPad resting thereon in either portrait or landscape position, a dock connector, an operating circuit for processing an audio signal from the iPad via the connector, and two speaker drivers for reproducing sound based on an audio signal from the iPad and processed by the operating circuit. The connector is connected to the operating circuit by a cable extending outside the housing. The seat has a void, e.g., hole or recess, for accommodating the connector when the iPad is supported by and resting on the seat in the portrait position. The cable is of a sufficient length such that the connector will remain in connection with the iPad when the iPad is turned and supported by and resting on the seat in the landscape position.

15 Claims, 10 Drawing Sheets

(56) References Cited

U.S. PATENT DOCUMENTS

2011/0046757 A1 2/2011 Leung
2012/0189156 A1 7/2012 Leung

OTHER PUBLICATIONS

Hong Kong Patent Office, Hong Kong Short-Term Search Report in Hong Kong Patent Application 11111974.4 (Jan. 10, 2012).

* cited by examiner

DOCKING STATION WITH SPEAKERS FOR MEDIA PLAYER

The present invention relates to a speaker docking station for a media (or multimedia) player which is an electronic device having media playing functions for audio and/or video, such as an iPod, iPhone or iPad.

BACKGROUND OF THE INVENTION

Media players of the type concerned in general are becoming ever increasingly popular such as iPad and iPhone, which may be used in either portrait or landscape position. Most of these media players have built-in speakers but such speakers are often not of an adequate power and/or quality to meet higher expectations. Speaker docking stations equipped with more powerful, better quality speakers are available on the markets for connecting such media players to play better sound. Some of the speaker docking stations includes a hinged or otherwise pivotable bracket for holding the media player for turning between the portrait and landscape positions, but the incorporation of such brackets renders the docking stations complicate in construction and more expensive in production costs, and some of these brackets are found to be vulnerable to damage through use.

The invention seeks to mitigate or at least alleviate such a problem by providing a new or otherwise improved speaker docking station.

SUMMARY OF THE INVENTION

According to the invention, there is provided a speaker docking station for a media player, comprising a housing having a seat for supporting a said media player resting thereon in either one of two first and second positions, a connector for connection with an operating circuit of said media player, an operating circuit in the housing and connected to the connector for processing an audio signal from said media player via the connector, and at least one speaker driver located in the housing and connected to the operating circuit for reproducing sound based on an audio signal from said media player and processed by the operating circuit. The connector is electrically connected to the operating circuit by a cable extending outside the housing. The seat has a void for accommodating the connector when said media player is supported by and resting on the seat in said first position. The cable is of a sufficient length such that the connector will remain in connection with said media player when said media player is turned and supported by and resting on the seat in said second position. The cable, that being flexible, permits free positioning of the connector and in turn said media player connected therewith. The cable allows the connector to be located in the void in the seat for connection with said media player in the said first position, and allows the connector to follow and remain connected with said media player when said media player being turned to and stays in said second position.

Preferably, the first position is a portrait position and the second position is a landscape position.

It is preferred that the seat has a trough for receiving a peripheral portion of said media player to support said media player.

It is further preferred that the seat has a U-shaped cross-section.

In a preferred embodiment, the seat has a one-piece structure having a hole acting as the void.

In another preferred embodiment, the seat has a one-piece structure having a recess acting as the void.

More preferably, the void has an opening of a cross-section fitting that of the connector for receiving and holding the connector against lateral displacement.

Further more preferably, the void has a shape matching with that of the connector for receiving and holding the connector in a substantially complementary manner.

Advantageously, the connector is connectable to a said media player in a first direction, and the cable extends from the connector in a second direction substantially at right angles to the first direction.

Advantageously, the cable comprises a flat cable.

In a preferred embodiment, the housing has an aperture through which the cable extends, the cable having an external section connected to the connector and an internal section restricted from extending out of the housing.

More preferably, the cable is fixed to the housing at an intermediate position between the external section and the internal section.

Further more preferably, the cable is in frictional engagement with the housing, at its intermediate position while extending through the aperture.

Yet further more preferably, the aperture has inner and outer ends relative to the housing and an S-shaped profile between its inner and outer ends.

It is preferred that the aperture is positioned directly above the seat.

It is preferred that the aperture is hidden from sight behind a cover on the front of the housing.

It is further preferred that the cover provides a back support for said media player on the seat.

It is preferred that the aperture has an outer side which blocked on one lateral side to confine the cable to be pivotable to the opposite lateral side.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
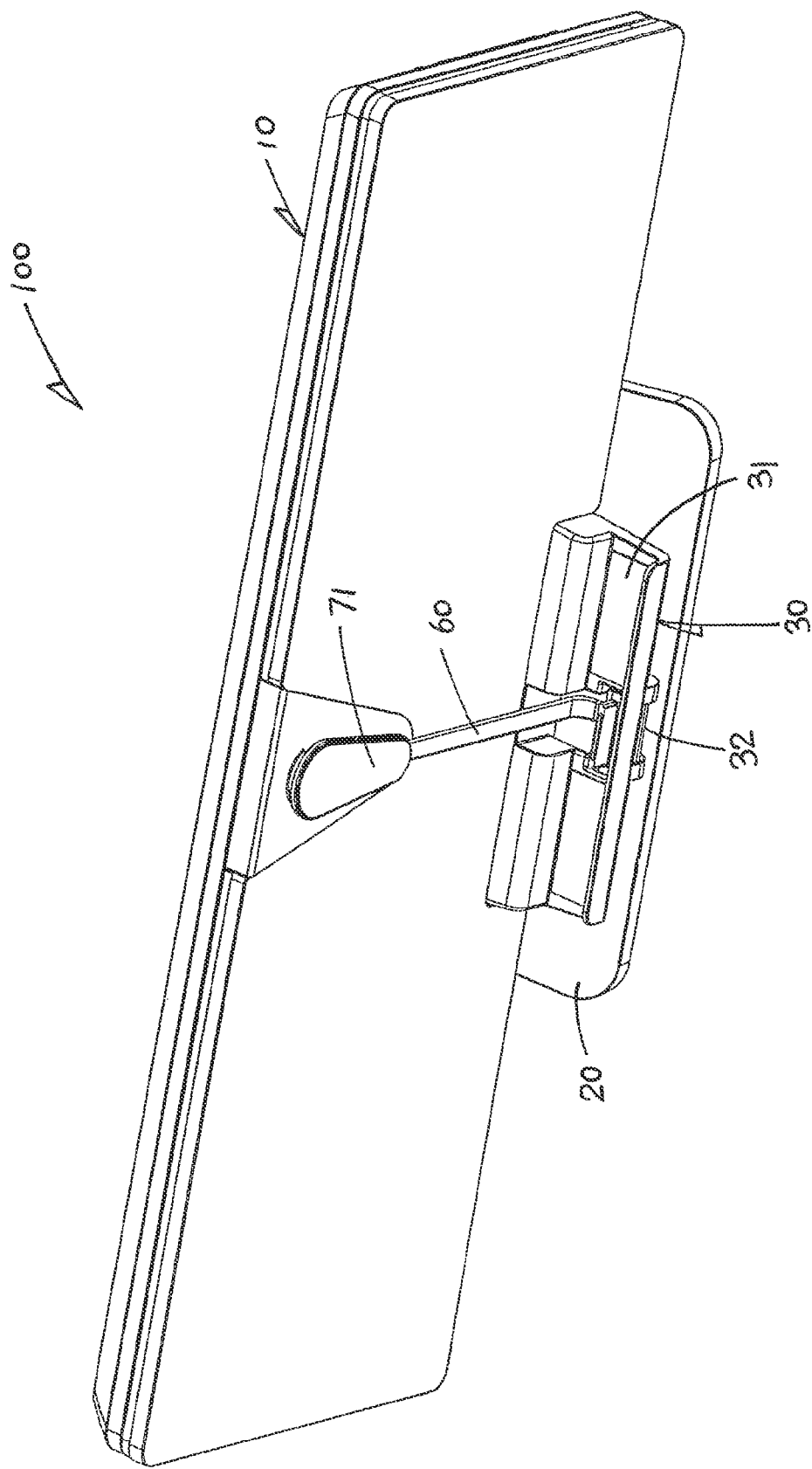
FIG. 1 is a perspective view oaf an embodiment of a speaker docking station for an iPad or iPhone (i.e. media player in general) in accordance with the invention.
Figure 2:
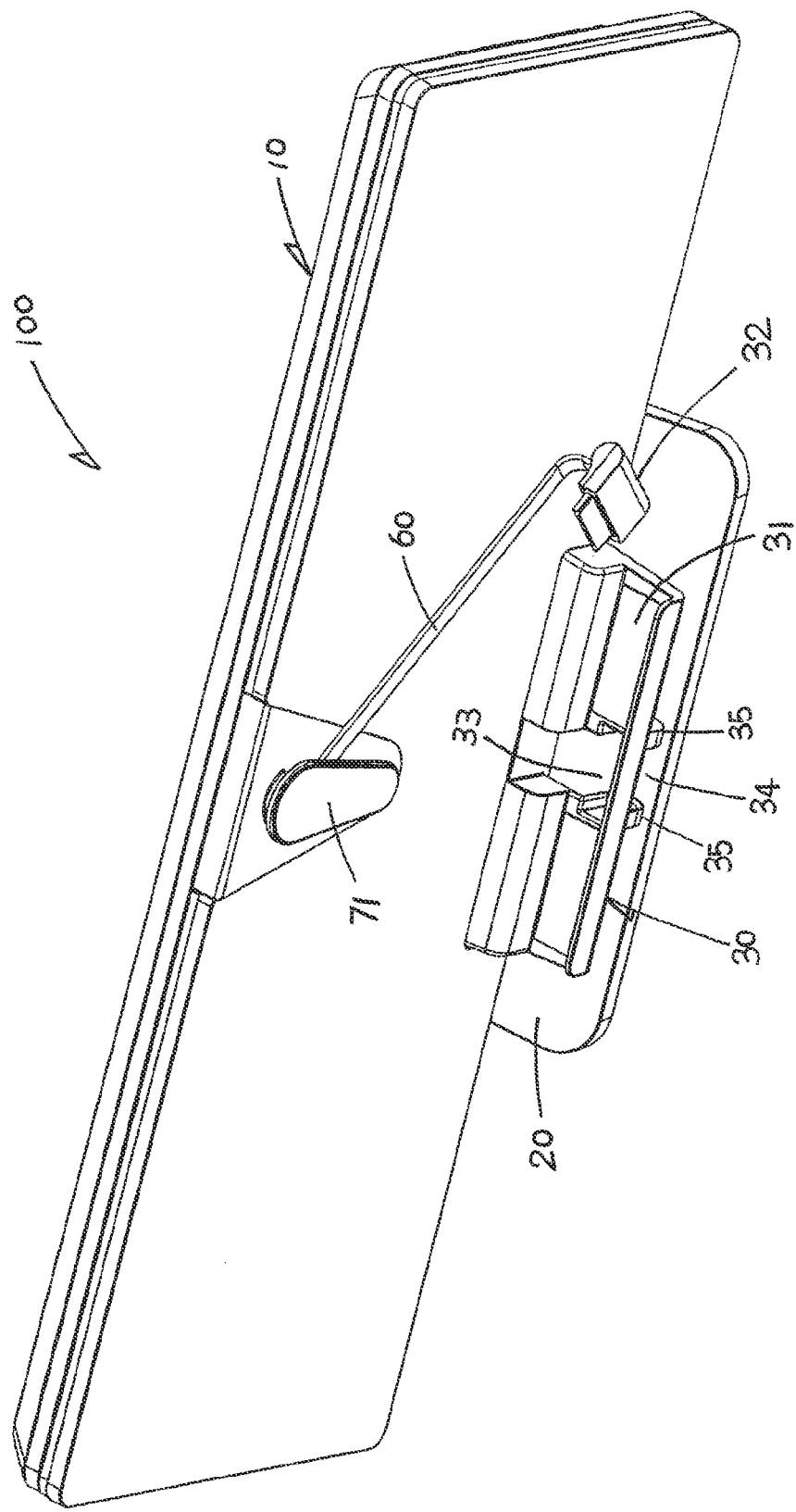
FIG. 2 is a similar perspective view of the speaker docking station of FIG. 1, showing a dock connector with cable moved to a different position.
Figure 3:
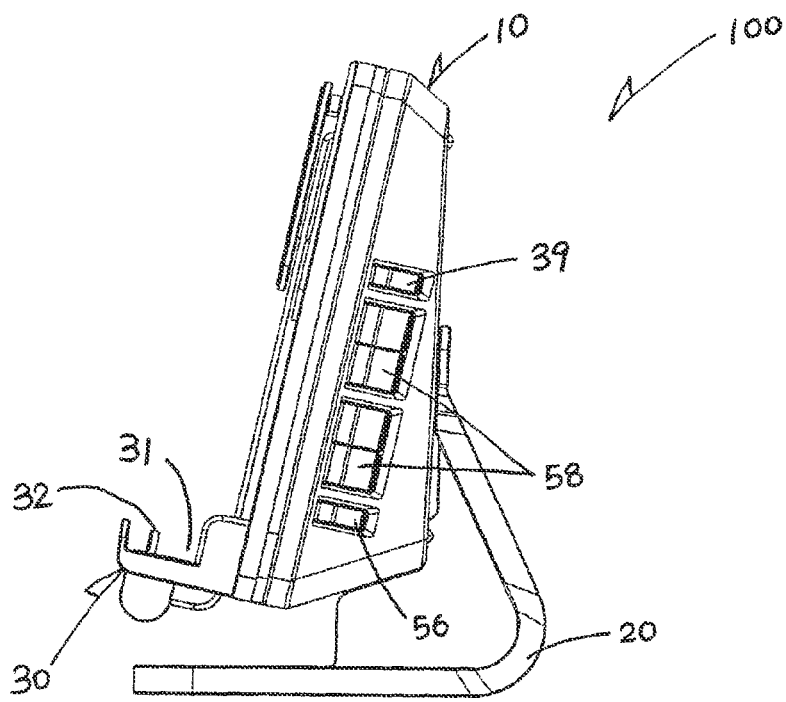
FIG. 3 is a right side view of the speaker docking station of FIG. 1.
Figure 4A:
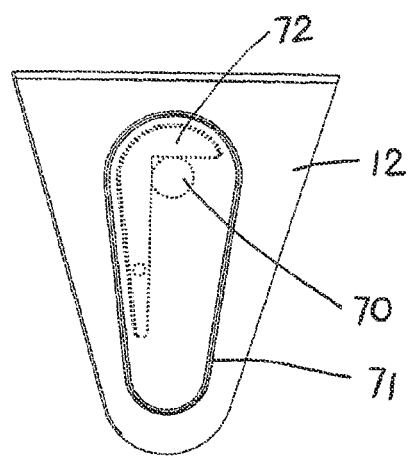
FIGS. 4A and 4B are front and perspective views of parts on the front of the speaker docking station of FIG. 1.
Figure 4B:
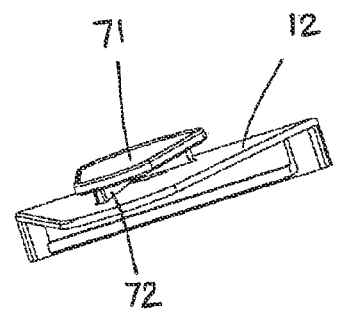
Figure 5:
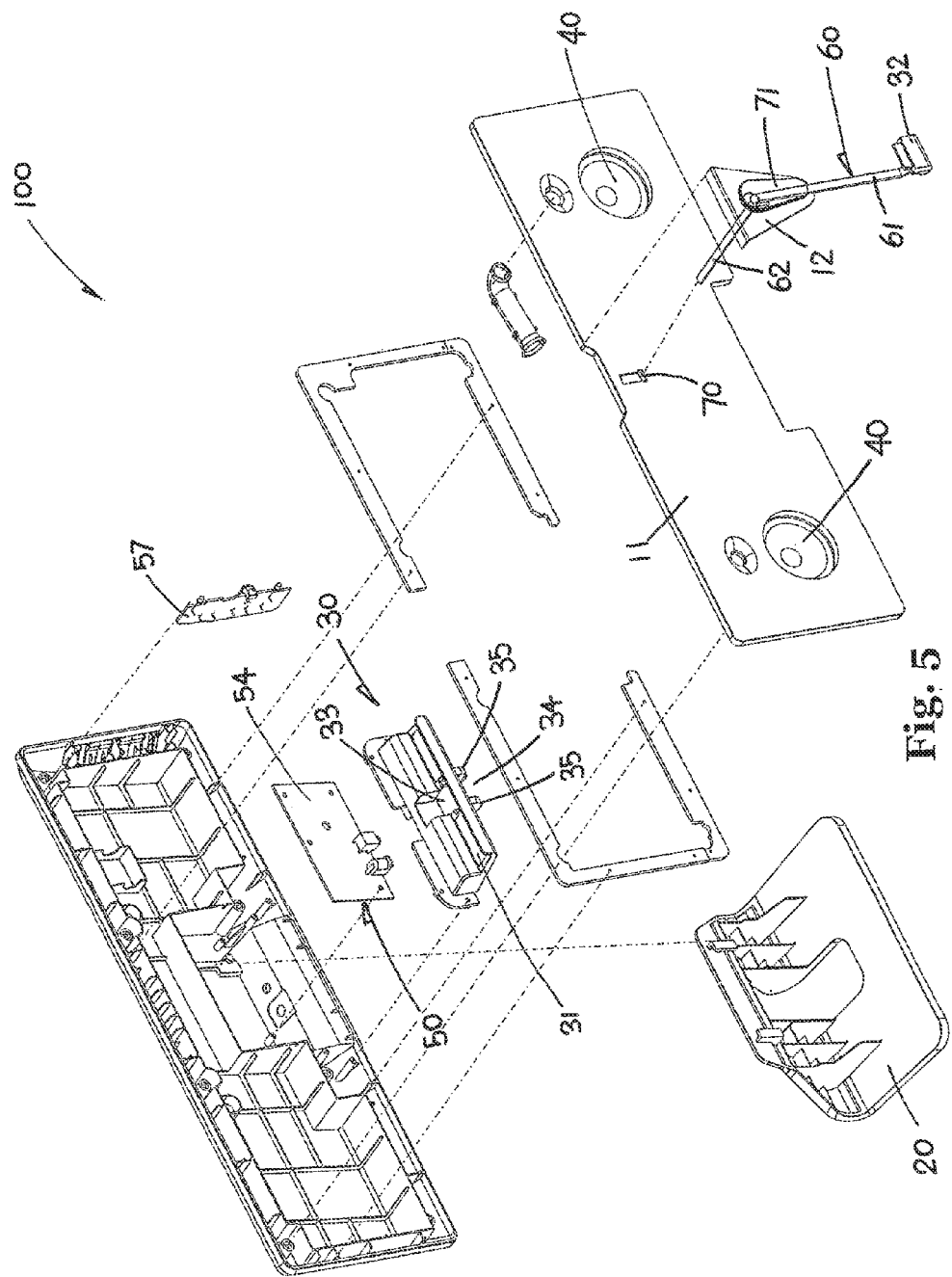
FIG. 5 is an exploded perspective view of the speaker docking station of FIG. 1.
Figure 6:
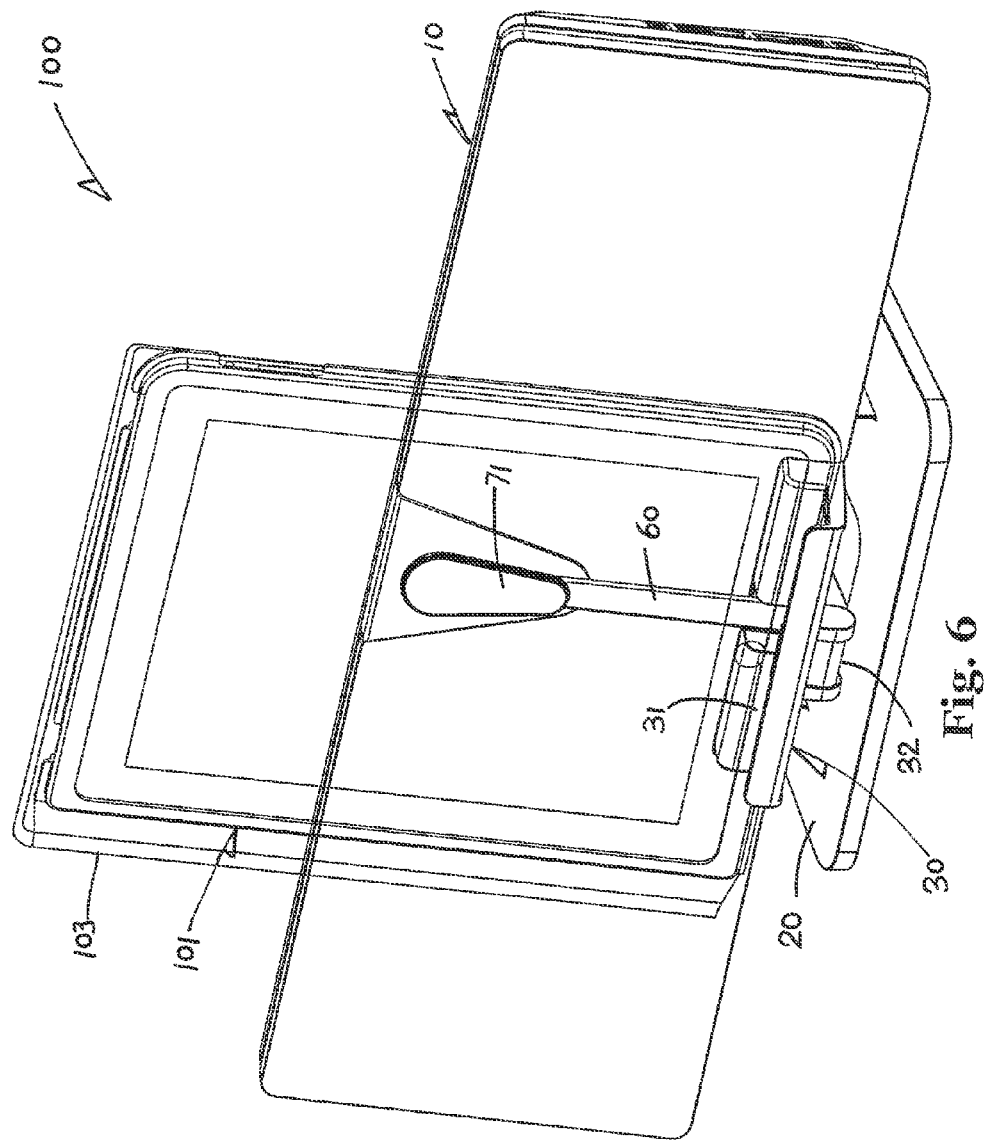
FIG. 6 is a perspective view of the speaker docking station of FIG. 1, with an iPad docked in the portrait position.

Referring to the drawings, there is shown a speaker docking station 100 for docking a media player, such as an iPad 101 or iPhone 102, embodying the invention. The docking station 100 has a housing 10 with a front housing wall 11, a stand 20 at the bottom, and a seat 30 centrally on the front side of the housing 10 and at a lowermost position above the stand 20. The housing 10 including its front wall 11 is generally flat rectangular and stands in a landscape position, reclining slightly rearwards. The front wall 11 is covered by a speaker grille, immediately behind opposite left and right portions of which a pair of speaker drivers 40 is mounted on the wall 11, front-facing internally of the housing 10, to bring about audio reproduction for the iPad 101 or iPhone 102 docked at the station 100.

The seat 30 is an oblong one-piece structure extending horizontally along a middle portion of the lower edge of the front of the housing 10. The seat 30 has a U-shaped cross-section and more specifically includes a trough 31 along its entire length for receiving therein an edge portion of the iPad 101 (or iPhone 102), thereby supporting the iPad 101 resting thereon. The iPad 101 may be supported on the seat 30 in either one of two first and second positions i.e. portrait or landscape position.

The various functions, including audio functions in particular, of the speaker docking station 100 are implemented by an operating circuit 50 mounted on a main printed circuit board 54, with associated keys 58 on a subsidiary printed circuit board 57, both being located in the housing 10. The operating circuit 50 incorporates an audio signal processor 51 for processing audio signals from the iPad 101 or received via an auxiliary input socket 39, and an audio power amplifier 52 connected to the audio signal processor 51 for amplifying the signals processed by the processor 51 in order to drive the speaker drivers 40. The speaker drivers 40 are connected to the audio power amplifier 52 (i.e. to the operating circuit 50 in general) for reproducing sound based on signals from the iPad 101 amplified by the amplifier 52 (i.e. processed by the operating circuit 50 in general).

There are also an MCU (microprocessor control unit) 53 for controlling the audio signal processor 51, and a voltage regulator 55 which converts the AC mains voltage into a number of lower DC voltages for powering the audio signal processor 51, the audio power amplifier 52 and the MCU 53, and may also provide an 5V USB power socket 56. Both sockets 39 and 56 are located along with the keys 58 on the right side periphery of the housing 10.

The speaker docking station 100 includes a generally flat rectangular dock connector 32 to which the operating circuit 50 is connected for processing audio signals received from the iPad 101 via the connector 32. The dock connector 32 is a standard 30-pin connector for iPhones, iPads and iPods, and it provides connection with the internal operating circuit of the iPad 101 (or iPhone 102) via a standard port of the latter. The connector 32 is electrically connected to the operating circuit 50 by means of a flexible cable 60 that extends outside the housing 10.

Whilst the dock connector 32 is connectable to the iPad 101 (or iPhone 102) in a first direction parallel to the plane of the iPad 101, the cable 60 extends from the connector 32 in a second direction substantially at right angles to the first direction, i.e. perpendicular to the plane of the iPad 101, and to the rear of the iPad 101.

There is an aperture 70 through the housing wall 11 on the front of the housing 10, at a position directly above and vertically aligned with the seat 30, through which aperture 70 the cable 60 extends. The aperture 70 hidden from sight behind a relatively small flat cover 71 fixed on the front of the housing 10, overlying the aperture 70 at a small distance apart. The cover 71 is of an inverted-pear shape.

The cable 60 is a flat cable. It has an external section 61 connected to the connector 32 and an internal section connected to the operating circuit 50 and, more specifically, to the audio signal processor 51 for audio processing and to the MCU 53 for exchange of control signals. The internal section 62 is restrained from extending out of the housing 10 such that the cable 60 exposed outside the housing 10, i.e. its external section 61, is of a preset length.

The cable 60 is anchored to the housing 10 at an intermediate position between its external section 61 and its internal section 62, at where the cable 60 extends through the aperture 70. An inverted-triangular plate 12 and a small cross member 13 are fixed on opposite front and rear sides of the aperture 70, which form a small gap with the housing wall 11 on either side, immediately front of and behind the housing wall 11.

Figure 7:
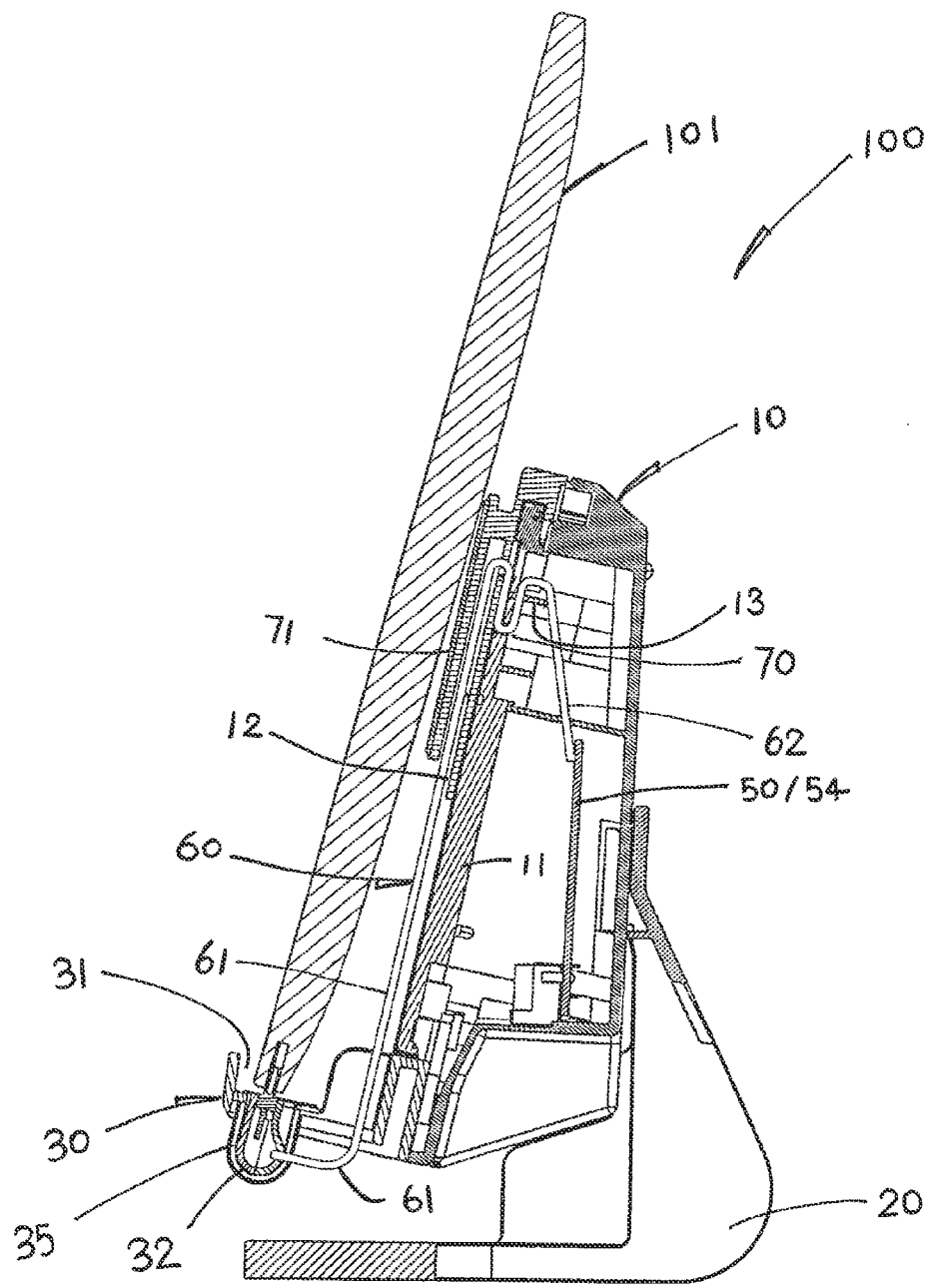
FIG. 7 is a cross-sectional right side view of the speaker docking station of FIG. 6, showing part of its internal construction.

The cover 71, the plate 12, the housing wall 11 and the cross member 13, taken sequentially from front to back, together form a four-layered structure with an internal S-shaped (or serpentine) path of parallel linear sections through between adjacent layers (FIG. 7). The S-shaped path includes the aperture 70 and extends in opposite directions between the exterior and the interior of the housing 10 about the aperture 70. The path, by extending through the aperture 70, acts as extensions of the aperture 70 on opposite open sides thereof. Thus, the extended aperture 70 has inner and outer ends relative to the housing 10, i.e. about the housing wall 11, and an S-shaped profile between its inner and outer ends.

Through the aperture 70, the flat cable 60 extends along the S-shaped path. By being marginally thinner than the path and/or U-turning along the path, the cable 60 is in frictional engagement with the path, and hence the housing 10, along its the length about its intermediate position while extending through the extended aperture 70.

Returning to the iPad 101 and iPhone 102, their port is situated at the bottom in the portrait position of the device. The connector 32 therefore sticks out from the bottom of the iPad 101 or iPhone 102 when it is connected to the port.

To accommodate the connector 32, the seat includes, at its mid-length, an opening 33 providing access to a cavity or empty space, into which the connector 32 enters when the iPad 101 is supported by and resting on the seat 30 in the portrait position. The opening 33 is a horizontal opening, when viewed from above, of a rectangular cross-section fitting the connector 32 for receiving and holding the connector 32 against lateral displacement. By reason of the connector 32 being confined in the opening 33 and restricted against lateral displacement, the iPad 101 is located in a well-defined stable position while resting centrally on the seat 30.

Dependent from the seat 30 and on opposite left and right sides of the opening 33, the opening 33 is flanked by a pair of shell-like tabs 35 facing each other inwardly. The two tabs 35 are of a shape matching with, albeit marginally larger than, that of opposite left and right sides of the connector 32, together partially defining the opening having a shape matching that of the connector 32 for receiving and holding the connector 32 in a substantially complementary manner. The cavity is equivalent to a recess 34, and in particular a 3-dimensional recess, which receives and accommodates the connector 32 in a sliding fit such that the connector 32 is not only restricted in lateral displacement but also held against tilting to the left or right or to the front or back, thereby resulting in an even more stable portrait position for the iPad 101 or iPhone 102. While unconnected, the connector 32 may be located in the recess 34 in isolation (FIG. 1), acting as a stationary dock connector upon which the iPad 101 or iPhone 102 may be lowered and connected in a single action.

The gap between the tabs 35 is left open to facilitate removal of the connector 32 especially when the connector 32 is not in use and stored in the recess 34. For a more practical reason, the gap accommodates the cable 60 that extends rearwardly from the connector 32, to the rear of the iPad 101 or iPhone 102 docked in the station 100. By extending rearwardly from the connector 32, the cable 60 at where it is joined to the connector 32 is hidden from sight by the connector 32, resulting in a neat design and appearance.

Insofar as its external section 61 is concerned, the cable 60 has a length such that when the connector 32 is located in the opening 33 of the seat 30, it extends vertically and straight between the cover 71 and the seat 30. By being a flat cable, the cable 60 more readily stays straight than a cable with a circular cross-section.

Figure 8:
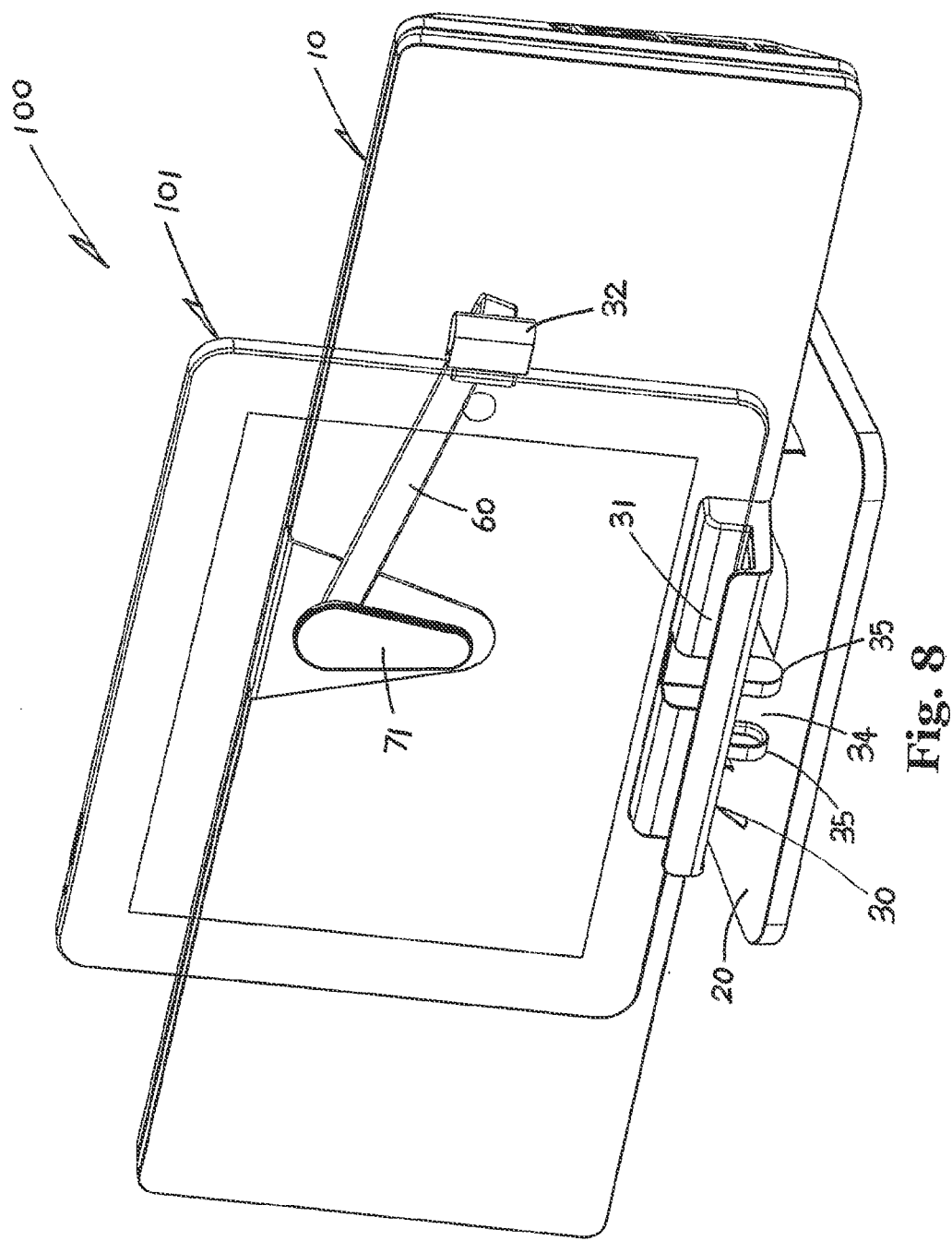
FIG. 8 is a similar perspective view of the speaker docking station of FIG. 6, with the iPad docked in the landscape position.
Figure 9:
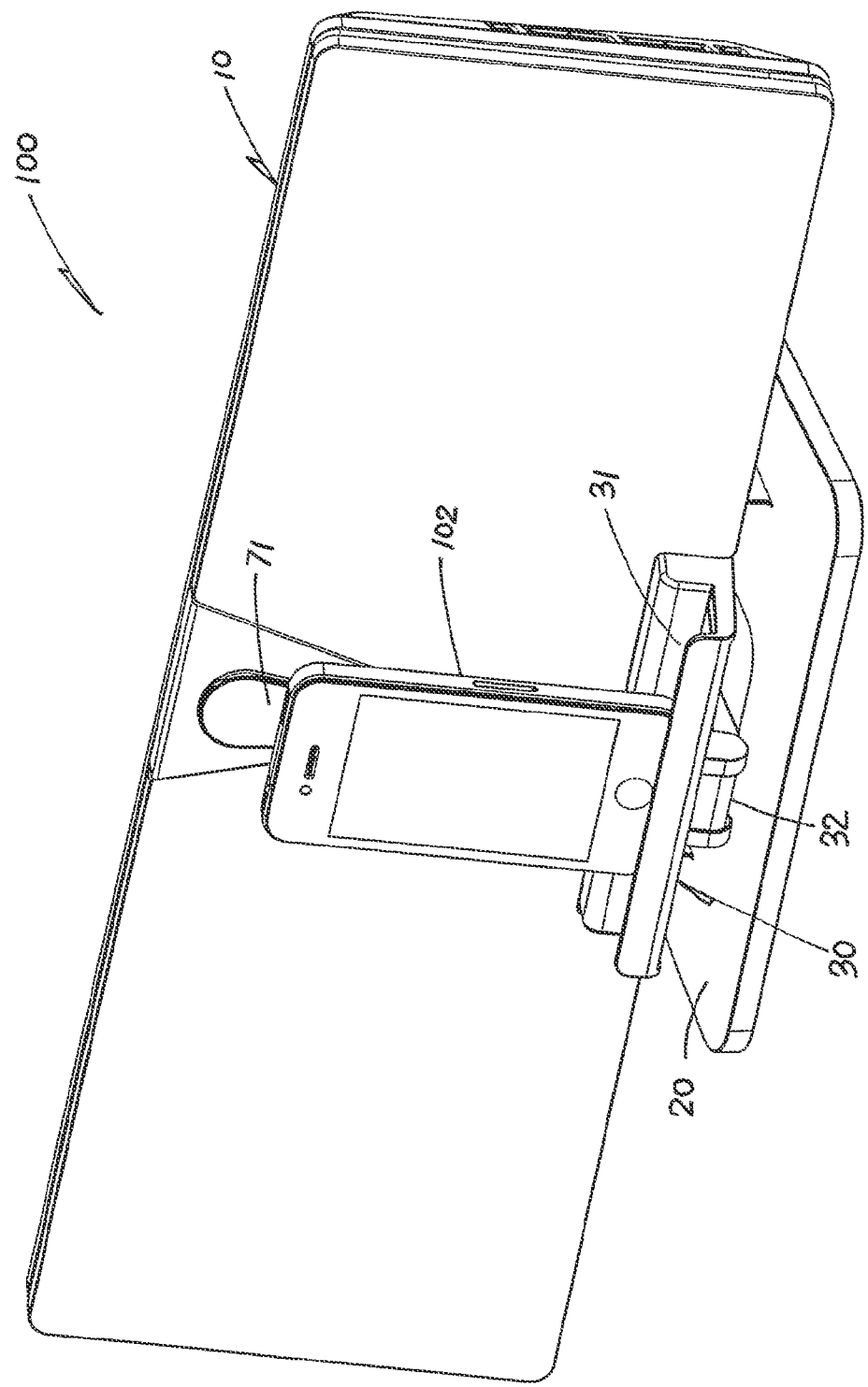
FIG. 9 is a perspective view of the speaker docking station of FIG. 1, with an iPhone docked in the portrait position.
Figure 10:
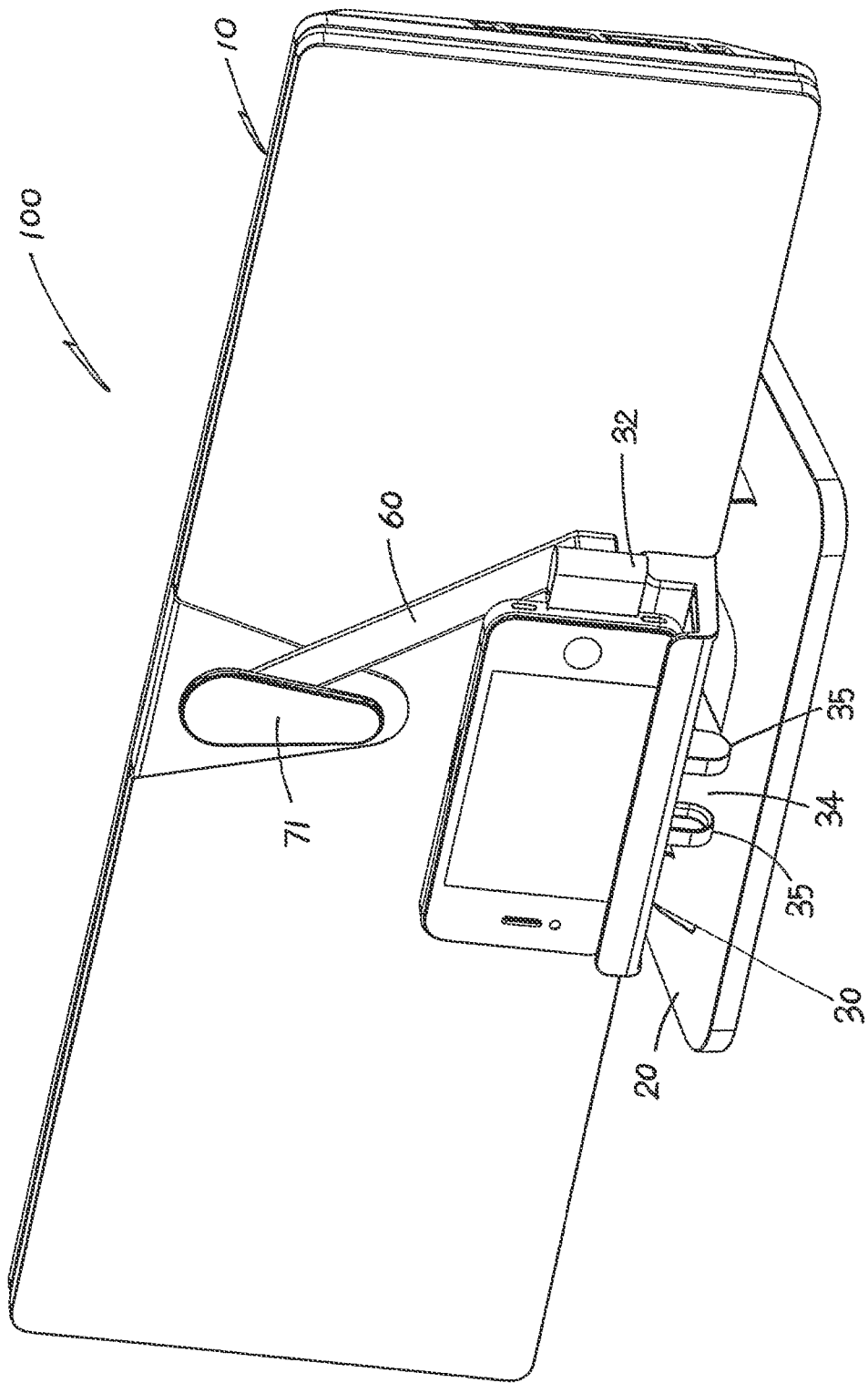
FIG. 10 is a similar perspective view of the speaker docking station of FIG. 9, with the iPhone docked in the landscape position.
Figure 11:
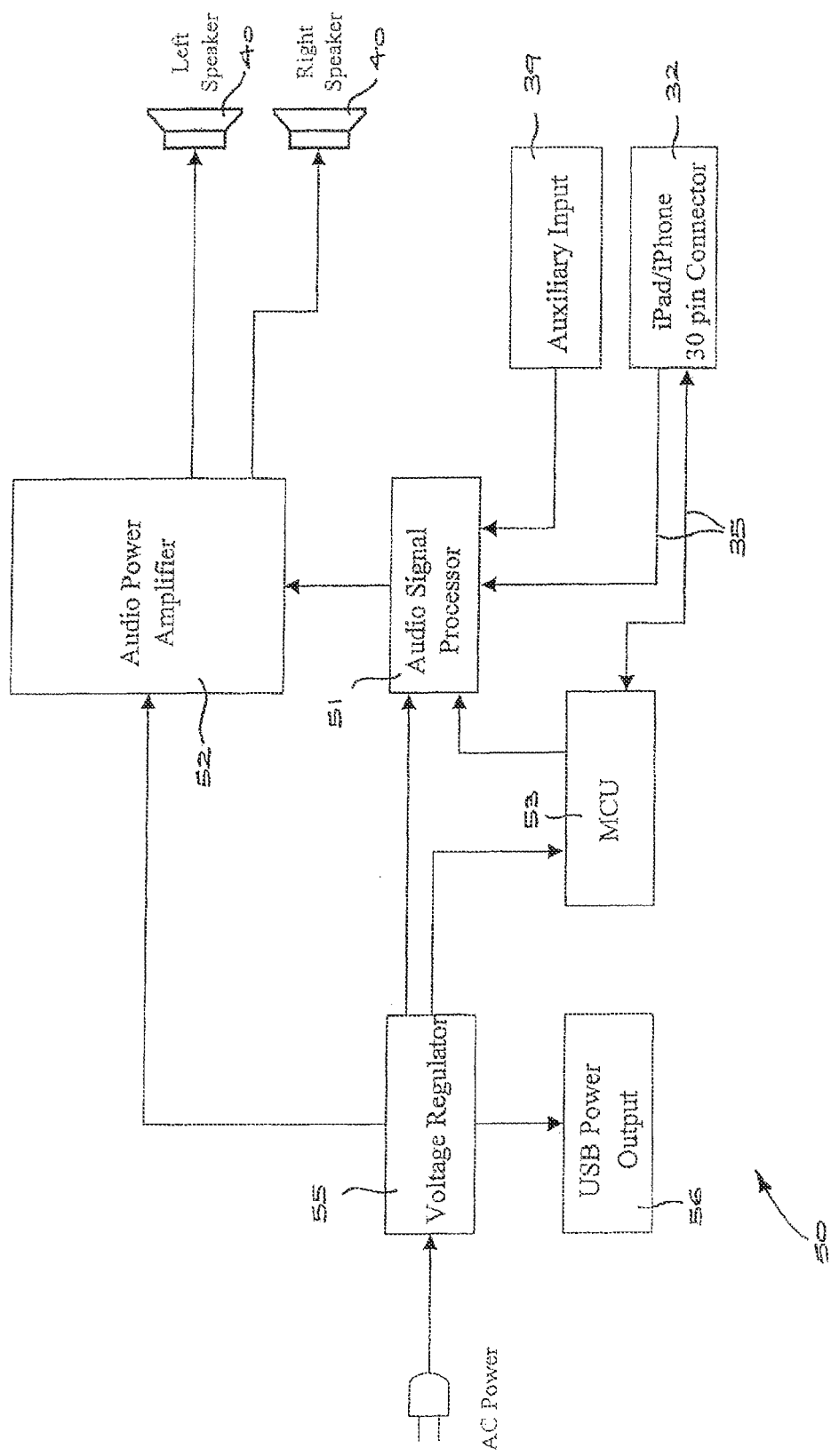
FIG. 11 is a schematic functional block diagram of an operating circuit of the speaker docking station of FIG. 1.

The cable 60 is of a sufficient length (again insofar as its external section 61 is concerned) such that the connector 32 is long enough to remain in connection with the iPad 101 when the iPad 101 is turned and is supported by and resting centrally on the seat 30 in the landscape position FIG. 8). The length of the cable 60 also permits placing of the iPhone 102 in the landscape position on the seat 30 (FIG. 10).

The cover 71 provides a back support for the iPad 101 in either the portrait or landscape position on the seat 30, and for the iPhone 102 in the portrait position.

It is preferred that in the landscape position, the iPad 101 or iPhone 102 should have the connector 32 on the right hand side, such that the home button is also on the right hand side to suit users who are usually right-handed. For this purpose, the aperture 70 is, on its outer side, blocked by a retainer 72 on the left (lateral) side to confine the cable 60 to be pivotable to the opposite right (lateral) side. The retainer 72 is a part attached on the inner side of the cover 71, and it extends along the left side as well as the top side of the aperture 70 to conceal the interior of the gap behind the cover 71 from above.

The speaker docking station of the subject invention may be used in any locations, including home and office, where a user may place his/her iPhone or iPad on the docking station 100 for viewing a movie or listening to music, whilst simultaneously charging the iPhone or iPad. The iPad or iPhone, while remaining connected, may easily be turned between the portrait and landscape positions, without the use of a hinge or pivotal bracket or mechanism in the docking station, which is vulnerable to damage through use.

The cable 60, that being flexible, permits free positioning of the connector 32 and in turn an iPhone or iPad connected therewith. In particular, the cable 60 allows the connector 32 to be located in a "void" or the hole 33 in the seat 30 for connection with an iPhone or iPad in the portrait position, and allows the connector 32 to follow and remain connected with the iPhone or iPad when the iPhone or iPad is being turned to and stays in the landscape position.

As a further advantage, by virtue of its flexibility, the cable 60 can accommodate or fit media players of different sizes (and indeed also shapes), provided of course that it is of sufficient length. Hence the speaker docking station may be used with, for example, the present models of iPhone and iPad and future models.

It is noted that the docking station is not limited to use with iPad and iPhone, for the mere fact that more of such handheld electronic devices with media playing functions are in the pipeline, named differently.

The invention has been given by way of example only, and various modifications of and/or alterations to the described embodiment may be made by persons skilled in the art without departing from the scope of the invention as specified in the appended claims.

The invention claimed is:

1. A docking station for a media player, the docking station comprising:
    a housing having a seat for supporting the media player on the seat in either one of alternative first and second positions;
    an electrical connector for connection to an operating circuit of the media player;
    an operating circuit of the docking station, wherein the operating circuit of the docking station is located in the housing, and is connected to the electrical connector for processing an audio signal received from the media player via the electrical connector;
    at least one speaker located in the housing and connected to the operating circuit of the docking station for reproducing sound based on the audio signal received from the media player and processed by the operating circuit of the docking station; and
    a flexible cable extending within and outside the housing, connected at a first end, outside the housing, to the electrical connector, and connected at a second end, inside the housing, to the operating circuit of the docking station, wherein
        the seat has a cavity accommodating the electrical connector and an opening having an area and that provides access to the cavity,
        the opening is defined, in part, by opposing substantially parallel tabs,
        the opening is complementary to the electrical connector so that the electrical connector may be received in and withdrawn from the cavity through the opening,
        the tabs are sufficiently spaced apart to hold the electrical connector in the cavity, while restricting lateral movement of the electrical connector, in the opening, transverse to the tabs, when the electrical connector is located in the cavity,
        the flexible cable has a sufficient length such that the electrical connector, when connected to the media player, will remain connected to the media player when the media player is moved from the first position, supported by the seat, to the second position and is supported by the seat in the second position, and
        the flexible cable permits positioning of the electrical connector in the cavity in the seat when the electrical connector is not connected to the media player, for connection to the media player in the first position, and allows withdrawal of the electrical connector from the cavity when the media player is connected to the electrical connector and is moved from the first position to, and stays in, the second position, supported by the seat.

2. The docking station as claimed in claim 1, wherein the first position is a portrait position and the second position is a landscape position.

3. The docking station as claimed in claim 1, wherein
the seat has a trough for receiving and supporting a peripheral portion of the media player, and
the opening is centrally located along a length direction of the trough.

4. The docking station as claimed in claim 1, wherein the seat has a one-piece structure.

5. The docking station as claimed in claim 1, wherein the electrical connector is connectable to the media player in a first direction, and the flexible cable extends from the electrical connector in a second direction that forms substantially a right angle with the first direction.

6. The docking station as claimed in claim 1, wherein the flexible cable comprises a flat cable.

7. The docking station as claimed in claim 1, wherein
the housing has an aperture through which the flexible cable extends, and
the flexible cable has an external section connected to the electrical connector, and an internal section within the housing.

8. The docking station as claimed in claim 3, wherein the seat has a U-shaped cross-section.

9. The docking station as claimed in claim 7, wherein the flexible cable is fixed to the housing at an intermediate position located between the external section and the internal section.

10. The docking station as claimed in claim 7, wherein the aperture is positioned directly opposite the seat.

11. The docking station as claimed in claim 7 including a cover on a front of the housing, wherein the aperture is hidden from sight behind the cover on the front of the housing.

12. The docking station as claimed in claim 7, wherein the aperture has an outer side which is blocked on a first lateral side and permits pivoting of the flexible cable only toward a second lateral side of the aperture, that is opposite the first lateral side of the aperture.

13. The docking station as claimed in claim 9, wherein the flexible cable is in frictional engagement with the housing, at the intermediate position, and extends through the aperture.

14. The docking station as claimed in claim 13, wherein the aperture has inner and outer ends, relative to the housing, and an S-shaped profile between the inner and outer ends.

15. The docking station as claimed in claim 11, wherein the cover provides a back support for the media player, when the media player is located on the seat.

* * * * *